(12) United States Patent
Sizov et al.

(10) Patent No.: US 10,483,902 B1
(45) Date of Patent: Nov. 19, 2019

(54) SYSTEM AND METHOD FOR REDUCING CURRENT HARMONIC DISTORTION IN A MOTOR CONTROLLER

(71) Applicant: Rockwell Automation Technologies, Inc., Mayfield Heights, OH (US)

(72) Inventors: Gennadi Sizov, Shorewood, WI (US); Ahmed S. Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/116,106

(22) Filed: Aug. 29, 2018

(51) Int. Cl.
  *H02P 29/50* (2016.01)
  *H02P 25/022* (2016.01)
  *H02M 1/12* (2006.01)
  *H02P 21/22* (2016.01)
  *H02M 1/00* (2006.01)

(52) U.S. Cl.
  CPC ............ *H02P 29/50* (2016.02); *H02M 1/126* (2013.01); *H02P 21/22* (2016.02); *H02P 25/022* (2013.01); *H02M 2001/0009* (2013.01)

(58) Field of Classification Search
  USPC ........................................................ 318/139
  See application file for complete search history.

(56) References Cited

U.S. PATENT DOCUMENTS

| | | | | |
|---|---|---|---|---|
| 5,345,375 A | * | 9/1994 | Mohan | H02J 3/01 307/105 |
| 6,340,891 B1 | * | 1/2002 | Yagi | G01R 31/021 324/544 |
| 7,768,220 B2 | | 8/2010 | Schulz et al. | |
| 2003/0062776 A1 | * | 4/2003 | Skibinski | H02J 3/1842 307/105 |
| 2010/0123356 A1 | * | 5/2010 | Sihler | H02J 3/18 307/105 |

OTHER PUBLICATIONS

A. Sayed-Ahmed et al.; "Fault-Tolerant Technique for Delta-Connected AC-Motor Drives"; IEEE Transactions on Energy Conversion, vol. 26, No. 2, Jun. 2011—(8) pages.

* cited by examiner

*Primary Examiner* — Bentsu Ro
(74) *Attorney, Agent, or Firm* — Boyle Fredrickson, SC

(57) ABSTRACT

A current regulator for a motor controller reduces distortion of the current output to a motor. Feedback signals corresponding to the current present on the motor are transformed into a fundamental and a harmonic reference frame. Notch filters in each reference frame attenuate components of the current feedback signal from the other reference frame. Current regulators in each reference frame receive the filtered current feedback signal in the corresponding reference frame and generate an output signal that is used to regulate the output current to the motor to the desired level of current in the corresponding reference frame. The output signal from the regulator in the harmonic reference frame is transformed to the fundamental reference frame, and the output of the two regulators are combined in a common reference frame to generate a reference signal corresponding to the required voltage output to the motor to achieve desired operation.

20 Claims, 5 Drawing Sheets ence frame is one that rotates "synchronously" or in tandem with them motor. The resulting values of the current feedback signals in the synchronous, d-q reference frame appear as "DC" values in the motor controller. In other words, the feedback signals are no longer "AC" values that alternate in a sinusoidal manner according to the frequency applied to the motor, but rather are "DC" values having a constant magnitude corresponding to the magnitude of current present in each of the "d" and "q" axes.

SYSTEM AND METHOD FOR REDUCING CURRENT HARMONIC DISTORTION IN A MOTOR CONTROLLER

BACKGROUND INFORMATION

The subject matter disclosed herein relates generally to a system and method for reducing harmonic content present at the output of a motor controller and, more specifically, to a system and method for monitoring harmonic current content and regulating the harmonic current content in a synchronous reference frame to reduce the harmonic current content at the output of the motor controller.

Electrical rotating machines, such as electric motors or generators, have become widespread and are found in numerous applications and configurations. Electric machines include a stationary component (i.e., the stator) and a rotating component (i.e., the rotor). In electric motors, a magnetic field is established in the rotor, for example via magnets mounted to the rotor or via an electrical current applied to or induced in a coil wound on the rotor. A second, rotating magnetic field is established as a result of a stator current produced by a controlled voltage applied to the stator. Rotation of the magnetic field in the stator causes the magnetic field in the rotor to follow the stator field, thereby causing rotation of the rotor. A shaft or other drive member is mounted to the rotor and extends outside the rotor housing providing a mechanical coupling to a device, such as a gearbox, pump, or fan that is to be driven as the rotor rotates. The amplitude and frequency of the controlled voltage is varied to achieve desired operation of the motor.

As is known to those skilled in the art, motor controllers also referred to herein as motor drives are utilized to vary the amplitude and frequency of the voltage applied to a motor to achieve desired operation of the motor. A motor controller is configured to receive power at an input, where the input power may be supplied from either an alternating current (AC) source or a direct current (DC) source. If the input power is supplied from an AC source, a rectifier section converts the AC power to DC power. The DC bus, either from the output of the rectifier section or supplied directly from the DC source is provided to a DC bus within the motor controller. A current regulator and modulation techniques are used to control an inverter section which, in turn, supplies the required current and voltage to the motor from the DC bus to achieve desired operation of the motor.

As is further known to those skilled in the art, the current regulator is commonly provided in a two-phase, synchronous reference frame. For a three-phase motor, a physical current and/or voltage may be measured in a three-phase (abc) reference frame utilizing appropriate sensing devices. The sensing devices generate a signal corresponding to the measured current and/or voltage for each phase of the motor. A transformation is applied to the measured current and/or voltage to convert the measured values from a three-phase (abc) reference frame to a two-phase (dq) reference frame. The two-phase (dq) reference frame presents current along a direct axis (d-axis) and along a quadrature axis (q-axis). The d-axis current corresponds to the flux established by the stator in the motor, and the q-axis current is proportional to the amount of torque produced by the motor.

The transformation from the three-phase to the two-phase reference frame utilizes position feedback information from the motor to obtain an electrical angle of the current applied to the motor. The electrical angle of the current is, in turn, used in the transform to convert the feedback signals into a synchronous, d-q reference frame. The synchronous refer- A two-phase synchronous frame current regulator controls current independently in both the d-axis and in the q-axis to achieve a desired flux level in the motor and a desired torque output from the motor, respectively. Because the fundamental components of the current appear as DC components in both the "d" and "q" axes, the synchronous current regulator is configured to regulate a DC value using traditional control principles rather than attempting to regulate the sinusoidally varying current being applied to the motor.

The synchronous frame current regulator is, however, not without its limitations, The synchronous frame current regulator is configured to operate within a bandwidth by which the controller gains for the regulator are defined. The synchronous frame current regulator is able to compensate for disturbances and to maintain desired operation of the current output to the motor as long as the disturbances present in the current have a frequency less than the bandwidth of the synchronous current regulator. If however, the frequency of a disturbance exceeds the bandwidth of the synchronous current regulator, the regulator is no longer able to compensate for the disturbance to generate the desired output current for the motor.

In a motor controller, a modulation routine, such as pulse-width modulation (PWM), is used to generate the output current at varying amplitude and frequency. The modulation routine controls switches to selectively connect each phase to that DC bus of the motor controller. Preferably, the switching occurs at a frequency at least an order of magnitude greater than the desired frequency of operation for the motor and, may occur in a range between 1 kHz and 20 kHz. The modulation routine, however, may introduce undesirable current components at the switching frequency or at multiples, or harmonics, of the switching frequency. These harmonic components are often at frequencies above the bandwidth of the current regulator and result in some distortion of the current waveform supplied to the motor.

Thus, it would be desirable to provide an improved current regulator that reduces distortion of the current waveform at frequencies above the bandwidth of the current regulator.

Additionally, loading and commanded operation of the motor may introduce distortion in the current waveform. As the load and/or speed of operation increases, the magnitude of current output by the motor controller approaches the capacity of the inverter and as the speed of operation increases, the fundamental frequency of the current increase, approaching the bandwidth of the current regulator. The motor controller may not be able to maintain a sinusoidal output current, but rather some ripple and/or distortion may be introduced on the waveform.

The physical construction of the motor may introduce still another source of distortion in the current waveform. In some instances, the distortion may be due to the number of stator slots and rotor poles and the winding type selected such that the motor does not include sufficient winding harmonic filtering, resulting in significant induced voltage harmonic distortion, While certain motor design features, such as skewed slots or rotor lamination or magnet profiling may improve harmonic performance, these features are costly. As a design consideration, the motor may not utilize these design features but accept as a tradeoff some current ripple or other non-sinusoidal characteristics in the current waveform. In still other applications, the motor loading may cause stator and/or rotor magnetic saturation that can produce sill additional current waveform distortion. The frequency of the distortion may occur at the fundamental frequency of the motor or at multiples (i.e., harmonics) of the fundamental frequency of the motor.

Thus, it would be desirable to provide an improved current regulator that reduces distortion of the current waveform at any identified frequency.

It is also desirable to provide an improved current regulator that identifies harmonic content present on the current waveform and to compensate the current output to the motor to reduce the harmonic content present on the current waveform.

BRIEF DESCRIPTION

The subject matter disclosed herein describes an improved current regulator that reduces distortion of the current waveform and, further, that identifies harmonic content present on the current waveform and compensates the current output to the motor to reduce the harmonic content present on the current waveform. The current regulator receives feedback signals corresponding to the current present on the motor and transforms the feedback signals into two different reference frames. A first reference frame corresponds to a fundamental frequency of current being supplied to the motor. A second reference frame corresponds to a frequency of harmonic content present on the current being supplied to the motor. The frequency of the second reference frame may be selected based on distortion of the measured current waveform and updated dynamically or, optionally, the frequency of the second reference frame may be configured during commissioning of the motor controller and remain constant during operation.

The current regulator includes a notch filter in each reference frame. A first notch filter in the fundamental frequency regulator is configured to attenuate components of the current feedback signal that are present at the harmonic frequency. The first notch filter is executed on the current feedback signal at the fundamental frequency prior to providing the current feedback signal to the current regulator executing at the fundamental frequency. A second notch filter in the harmonic frequency regulator is configured to attenuate components of the current feedback signal that are present at the fundamental frequency. The second notch filter is executed on the current feedback signal at the harmonic frequency prior to providing the current feedback signal to the current regulator executing at the harmonic frequency. Each notch filter is configured to attenuate components of the current feedback signal in one reference frame that are to be regulated by the current regulator acting in the other reference frame.

A current regulator in each reference frame receives the filtered current feedback signal in the corresponding reference frame and a reference signal for the desired amount of current in that reference frame. Each current regulator generates an output signal that is used to regulate the current output to the motor to the desired level of current in the reference frame. The output signal from the regulator in the harmonic reference frame is transformed to the fundamental reference frame such that the output of the two regulators are in a common reference frame and may be combined. Alternately, the output signal from each of the regulators may first be transformed to the stationary reference frame and then they may be combined, again in a common reference frame. After combining the outputs of the regulators in either the fundamental synchronous or stationary reference frames, the current regulator outputs a single voltage reference to the gate driver module in order to supply the necessary voltage to the motor to achieve desired operation.

In one embodiment of the invention, a system for reducing current harmonic distortion in a motor controller is disclosed. The motor controller is operative to control operation of a multi-phase motor. The system includes at least two inputs, where each input is configured to receive a feedback signal corresponding to a current present in one phase of the motor, and a reference frame transformer operative to convert the feedback signals from the at least two inputs to a first synchronous current feedback signal and a second synchronous current feedback signal, The first synchronous current feedback signal is at a fundamental frequency, and the second synchronous current feedback signal is at a harmonic frequency. The system also includes a first and a second current regulator. The first current regulator is configured to receive a current reference signal and the first synchronous current feedback signal as inputs and to generate a first regulator output signal corresponding to desired operation of the motor at the fundamental frequency. The second current regulator is configured to receive the second synchronous current feedback signal as an input and to generate a second regulator output signal at the harmonic frequency. The motor controller is operative to sum the first regulator output signal and the second regulator output signal to generate a modified current regulator output signal.

According to another embodiment of the invention, a method for reducing current harmonic distortion in a motor controller is disclosed. The motor controller is operative to control operation of a multi-phase motor. A feedback signal is received from at least two current sensors, where each feedback signal corresponds to a current present in one phase of the motor, and the feedback signal is transformed to a first synchronous current feedback signal at a first frequency and transformed to a second synchronous current feedback signal at a second frequency, where the second frequency is greater than the first frequency. A first current regulator is operatively tuned for the first frequency to generate a first regulator output signal as a function of the first synchronous current feedback signal, and a second current regulator is operatively tuned for the second frequency to generate a second regulator output signal as a function of the second synchronous current feedback signal. An output signal is generated for the motor controller that is a function of the first regulator output signal and the second regulator output signal.

According to still another embodiment of the invention, a motor controller for reducing current harmonic distortion output to a multi-phase motor includes at least two current sensors, a memory device, and a processor. Each current sensor is configured to generate a feedback signal corresponding to a current output to one phase of the motor. The memory device is configured to store a series of instructions, and the processor is operative to execute the series of instructions. The processor executes the instructions to receive the feedback signals from the at least two current sensors, transform the feedback signals to a first synchronous current feedback signal at a first frequency, transform the feedback signals to a second synchronous current feedback signal at a second frequency, execute a current regulator to independently regulate current at the first frequency and at the second frequency, and generate an output signal from the current regulator that is a function of the independently regulated first and second frequencies.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
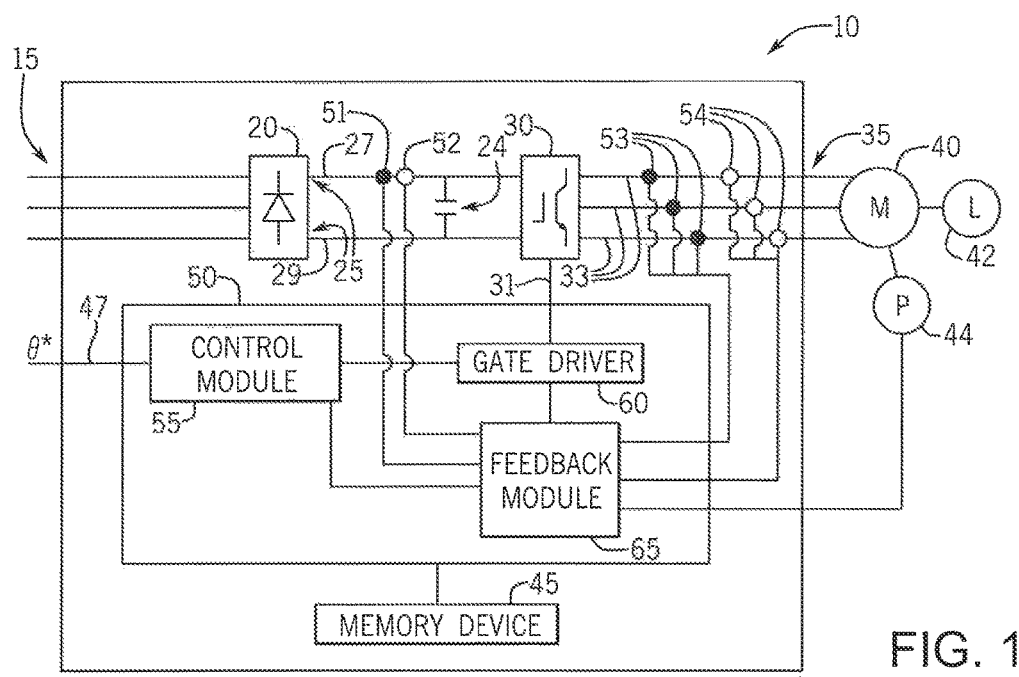
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
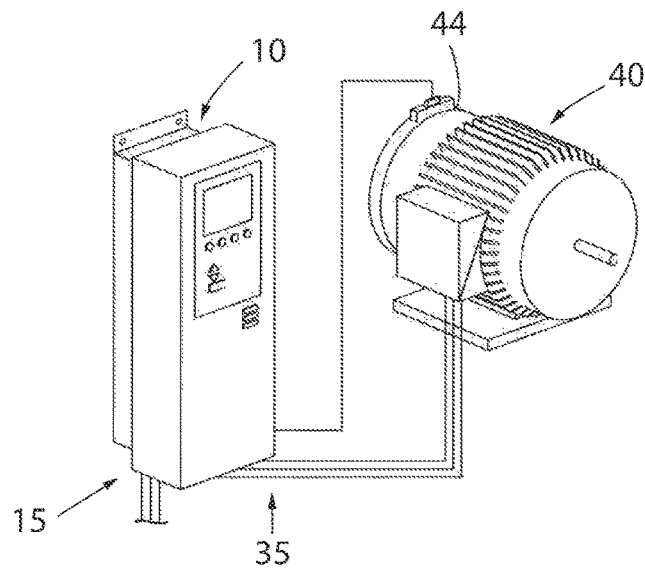
FIG. 2 is an exemplary motor drive and motor controlled by the motor drive in which one embodiment of the present invention is incorporated.
Figure 3:
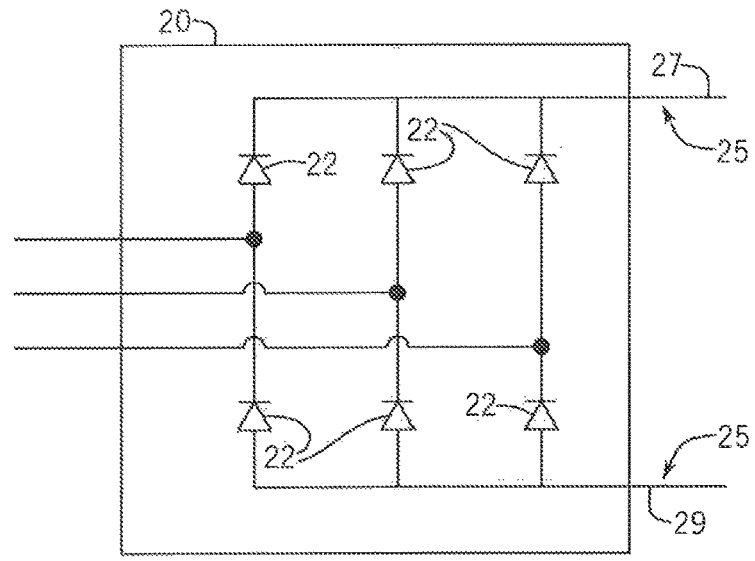
FIG. 3 is a block diagram representation of a rectifier section from the motor drive of 1.

Turning initially to FIGS. 1 and 2, a motor drive 10, which may be used in conjunction with the various embodiments of the invention disclosed herein, is configured to receive a three-phase AC voltage at an input 15 of the motor drive 10 which is, in turn, provided to a rectifier section 20 of the motor drive 10, The rectifier section 20 may include any electronic device suitable for passive or active rectification as is understood in the art. With reference also to FIG. 3, the illustrated rectifier section 20 includes a set of diodes 22 forming a diode bridge that rectifies the three-phase AC voltage to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 4:
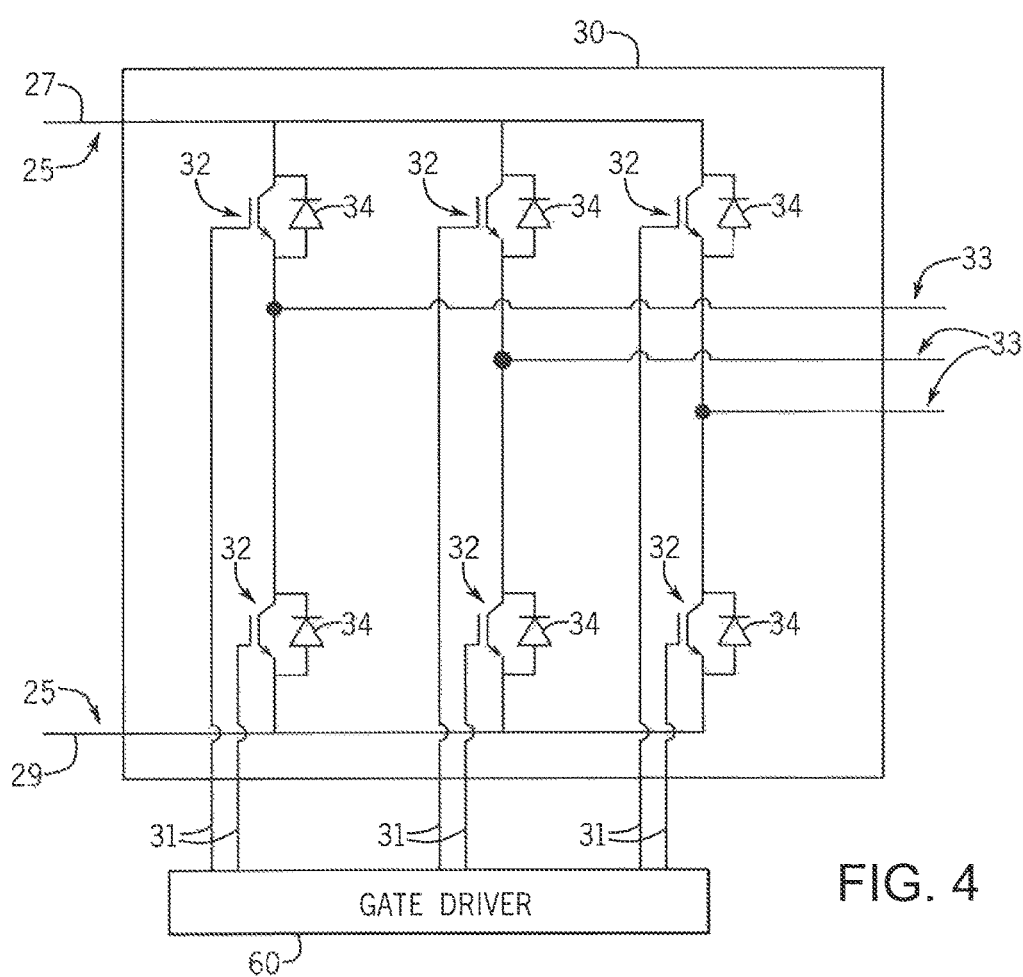
FIG. 4 is a block diagram representation of an inverter section and gate driver module from the motor drive of FIG. 1.

The DC bus 25 is connected in series between the rectifier section 20 and an inverter section 30. Referring also to FIG. 4, the inverter section 30 consists of switching elements, such as transistors, thyristors, or SCRs as is known in the art. The illustrated inverter section 30 includes an insulated gate bipolar transistor (JGBT) 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

The controller 50 receives a reference signal 47 identifying desired operation of the motor 40 connected to the motor drive 10. The reference signal 47 may be, for example, a position reference ($\theta^*$), a speed reference ($\omega^*$), or a torque reference ($T^*$). For discussion purposes herein, the reference signal 47 is illustrated as a position reference signal ($\theta^*$).

The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive.

The controller 50 utilizes the feedback signals and the reference signal 47 to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal 47 and executes responsive to the reference signal 47 and the feedback signals to generate a desired output voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40.

Figure 5:
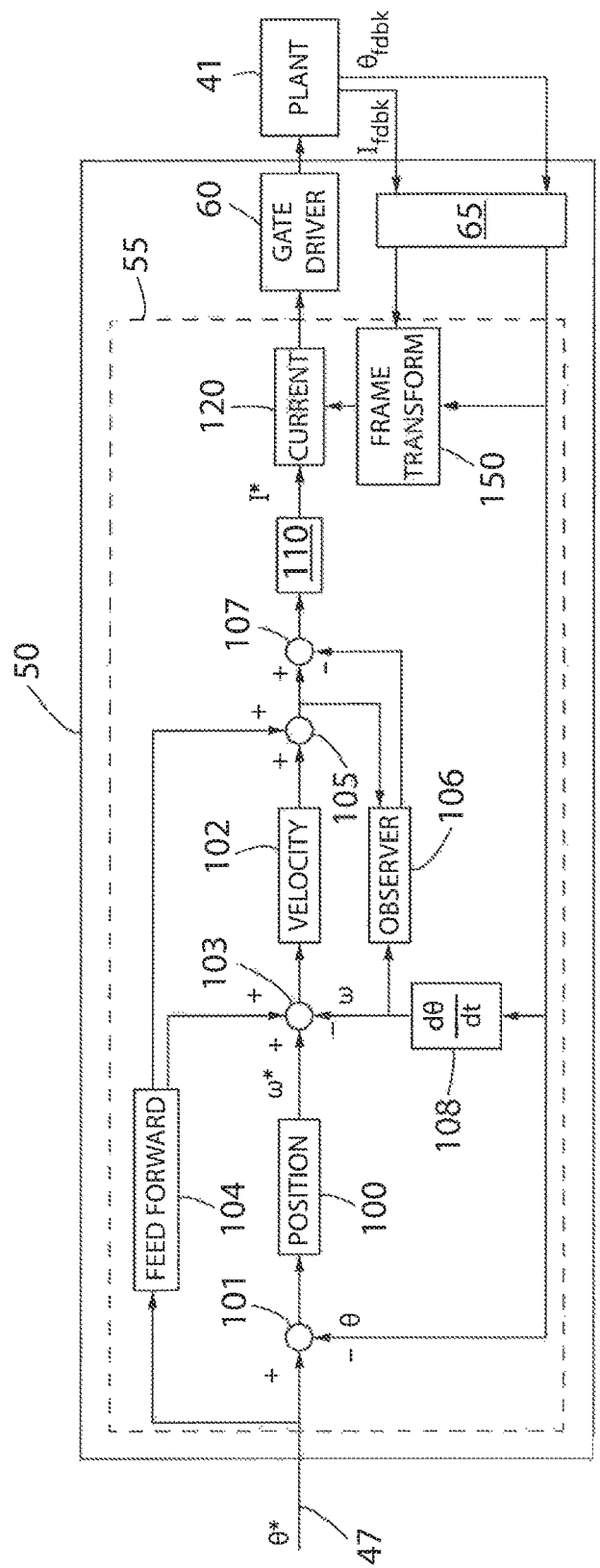
FIG. 5 is a block diagram representation of a controller used within the motor drive of FIG. 1.

Referring next to FIG. 5, an exemplary controller 50 for the motor drive 10 is illustrated. The controller 50 receives a position reference signal ($\theta^*$) 47 as an input. As also shown in FIG. 1, the position reference signal ($\theta^*$) 47 is provided to a control module 55. The control module 55 includes a number of control loops, or regulators. Each control loop, or regulator, may include one or more controller gains and control paths, and is configured to provide a desired output according to a reference input. According the embodiment illustrated in FIG. 4, the control module 55 includes a position control loop 100, a velocity control loop 102, and a current control loop 120. The control loops are shown as cascading control loops where an output of one control loop is provided as an input to another control loop. The control module 55 also includes a feedforward path 104 and a load observer 106. It is contemplated that various other control topologies may be utilized within the motor drive 10.

In the position control loop, the position reference signal ($\theta^*$) 47 is compared to a position feedback signal ($\theta$) at a first summing junction 101. A position error signal is output from the first summing junction 101 and input to a position loop controller 100. According to the one embodiment, the position loop controller 100 is a proportional-integral (PI) controller. Optionally, the position loop controller 100 may be just a proportional (P) controller or further include a derivative (D) component. Each of the proportional (P), integral (I), and/or derivative (D) components of the position loop controller 100 includes a controller gain. The position loop controller gains are commonly referred to as a position loop proportional gain (Kpp), position loop integral gain (Kpi), and a position loop derivative gain (Kpd). The output of the position loop controller 100 is a velocity reference signal ($\omega^*$).

In the velocity control loop, the velocity reference signal ($\omega^*$) is compared to a velocity feedback signal ($\omega$) at a second summing junction 103. The velocity feedback signal ($\omega$) is generated by taking a derivative, as shown in the derivative block 108, of the position feedback signal ($\theta$). The velocity feedback signal ($\omega$) may also be filtered by a velocity filter block. A velocity error signal is output from the second summing junction 103 and input to a velocity loop controller 102. According to one embodiment, the velocity loop controller 102 is a proportional-integral (PI) controller. Optionally, the velocity loop controller 102 may be just a proportional (P) controller or further include a derivative (D) component. Each of the proportional (P), integral (I), and/or derivative (D) components of the velocity loop controller 102 includes a controller gain. The velocity loop controller gains are commonly referred to as a velocity loop proportional gain (Kvp), velocity loop integral gain (Kvi), and a velocity loop derivative gain (Kvd). The output of the velocity loop controller 102 is an acceleration reference signal.

The control module 55 may also include feed forward branches 104. According to the illustrated embodiment, the control module 55 includes feed forward branches for both the velocity and the acceleration elements. Within the feedforward path 104, the position reference signal ($\theta^*$) is passed through a first derivative element to obtain a velocity feed forward signal. The velocity feed forward signal is multiplied by a velocity feed forward gain (Kvf) and combined with the velocity reference signal ($\omega^*$) and the velocity feedback signal ($\omega$) at the second summing junction 103. The velocity feed forward signal is passed through a second derivative element to obtain an acceleration feed forward signal. The acceleration feed forward signal is multiplied by an acceleration feed forward gain (Kaf) and combined with the acceleration reference signal at a third summing junction 105 to generate a modified acceleration reference signal.

It is further contemplated that the output of the third summing junction 105 may be an acceleration or torque reference signal. As is understood in the art, angular acceleration is proportional to torque and, more specifically, torque is equal to inertia times the angular acceleration. In some embodiments of the controller 50, calculations may be performed in a per unit system. Depending on the per unit system, a range of zero to one hundred percent acceleration may be equivalent to a range of zero to one hundred percent torque. As a result, a per unit value of acceleration would be equivalent to a per unit value of torque. In other embodiments, the inertia of the motor or the motor and load may be incorporated into the controller gains of the velocity loop controller 102 and in the acceleration feedforward path to output a torque reference from the third summing junction 105. In still other embodiments, the inertia of the motor may be included in a filter gain, for example, in a gain block 110 to convert the acceleration reference signal output from the third summing junction 105 to a torque reference signal. in still another embodiment, an inertia scaling gain may be provided in the gain block 110 to convert the acceleration reference, a*, to a torque reference.

The output of the third summing junction 105 is combined with a feedback signal from the load observer 106 at a fourth summing junction 107. According to one embodiment of the invention, the load observer 106 provides an estimated load torque, present at the motor shaft. The load observer 106 uses a torque reference signal (derived directly from the output of the third summing junction 105 or as a function of the inertia in the system) along with the velocity feedback signal (ω) to generate an estimated value of the load torque. The load observer 106 models the physical system present at the output of the motor but executes with faster dynamics than the physical system to generate an estimate of the load present at the output of the motor. The torque estimate may include both expected components and unexpected, or disturbance, components of loading applied to the motor. According to one embodiment of the invention, the load observer may determine an estimated disturbance torque according to Eq. 1, presented below.

$$\widehat{T}_d = T_{ref} - J\omega \quad (1)$$

where:
$\widehat{T}_d$ = estimated disturbance torque;
Tref=torque reference;
J=inertia; and
ω=angular velocity.

It is understood that the load observer 106 may utilize other methods of estimating the disturbance torque without deviating from the scope of the invention. For example, the load observer 106 may be tunable in a similar manner to the control loops discussed above, The observer may include a proportional (P) branch, an integral (I) branch, and/or a derivative (D) branch. Each branch of the Observer includes a proportional (P), integral (I), and/or derivative (D) gain. The observer gains are commonly referred to as an observer proportional gain (Kop), an observer integral gain (Koi), and an observer derivative gain (Kod). The load observer 106 may further include one or more filters to reduce undesirable components from the torque estimate. The load observer may use alternate input signals, such as angular position and angular acceleration either separately from or in combination with the angular velocity to determine the torque estimate. Similarly, the output of the load observer may be an estimated load torque signal, an estimated disturbance torque, or a combination thereof.

The output of the fourth summing junction 107 is provided as an input to a gain block 110. As indicated above, the gain block 110 may include various gains and/or filters to convert the units of values or to remove unwanted components from the control system. The gain block 110 may include, for example, a low pass filter to attenuate undesirable high frequency components, a notch filter to attenuate specific frequency components having an undesirable effect on the controlled mechanical load, an inertia scaling block to convert an acceleration reference to a torque reference, or a torque constant to convert a torque reference to a current reference. Further, multiple gains may be combined to a single block and/or incorporated into filter gains to reduce computational time for the control module 55, The output of the gain block 110 is a current reference signal, I*, provided to a current regulator 120.

The current regulator 120 uses the current reference signal, I*, and a current feedback signal ($I_{fdbk}$), generated by the current sensors 54, to regulate a current regulator output signal to a desired value. In one embodiment, the current regulator output signal is a voltage reference signal for the gate driver 60 which, in turn, generates the switching signals 31 to the inverter section 30.

The output of the gate driver 60 is illustrated as being supplied to the plant 41 of the controlled system. In a motion control system, the plant 41 typically includes the inverter section 30 of the motor drive 10, the motor 40, a mechanical load 42, a position feedback device 44, and mechanical couplings between the motor 40 and mechanical load 42 or between the motor 40 and a position feedback device 44. The position feedback device 44 generates the position feedback signal ($\theta_{fdbk}$) used by the control module 55.

Figure 7:
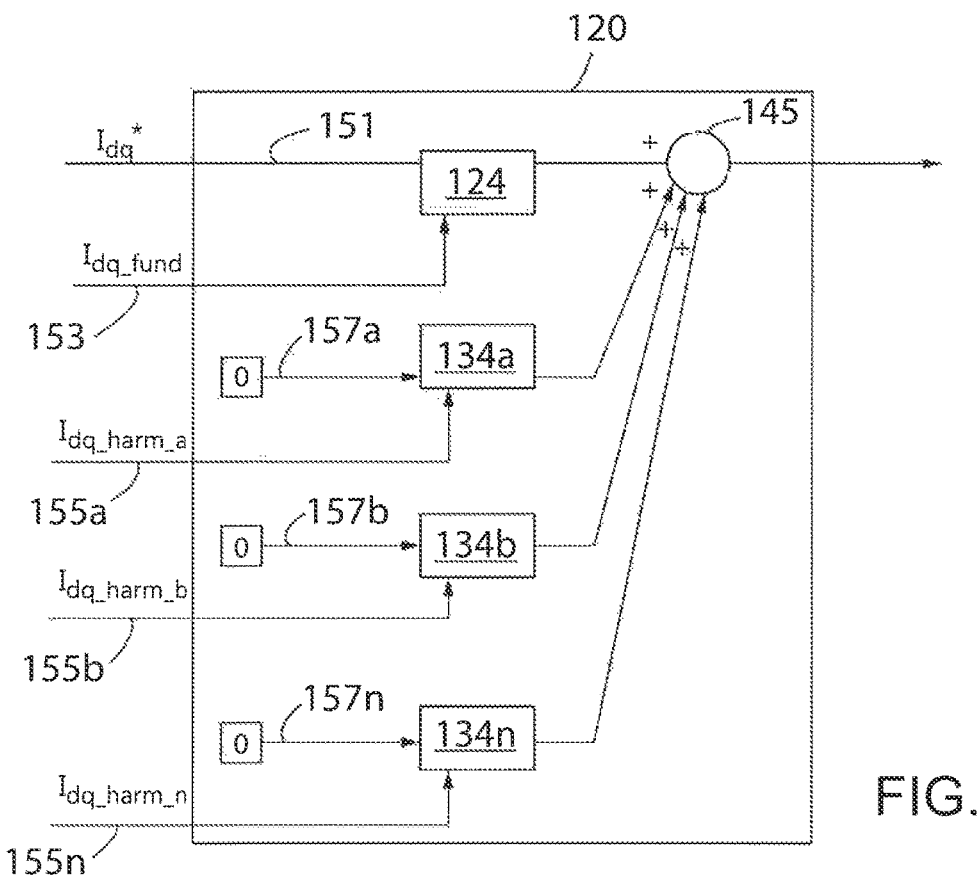
FIG. 7 is a block diagram representation of one embodiment of a current regulator used in FIG. 5.

Turning next to FIG. 7, the current regulator may include multiple control loops, or multiple regulators, executing in parallel with each other. A first current regulator 124 is configured to regulate current at a first frequency and a second current regulator 134a is configured to regulate current at a second frequency, where the second frequency is different from the first frequency. Still additional current regulators 134b-134n may be configured to regulate current at still other frequencies than the fundamental frequency or the first frequency. Each current regulator 124, 134 may include proportional, integral, and/or derivative components to regulate the current at the corresponding frequency for the regulator and generate an output for the individual current regulator. The output of the individual current regulators are summed together at a regulator summing junction 145 and provided as an output of the overall current regulator 120. The output of the overall current regulator 120 is provided to the gate driver 60 which, in turn, generates the switching signals 31 to the inverter section 30.

A traditional current regulator provides for regulation of the current at the desired operating frequency. The current regulator is tuned to provide stable operation across a desired range of frequencies. The range of frequencies may be, for example, 0-100 Hz or 0-1000 Hz. If undesired components exist in the current feedback signal at frequencies outside of the bandwidth of the regulator, the current regulator may partly attenuate but is unable to fully attenuate the undesired component, The undesired component may present itself as vibration on the motor. If the frequency of the component is sufficiently higher than the fundamental frequency and/or the inertia of the system is large, the undesired component may not introduce vibration but rather, the undesired component may introduce excess heating in the motor due to ripple current on the stator. Regardless of how the undesired component presents itself, it typically results in degradation of system performance.

In operation, the current regulator 120 disclosed herein includes multiple regulators 124, 134 operating in parallel to allow for both regulation of current at the desired operating frequency, or the fundamental frequency, and for compensation of current components, such as harmonic components, that are present in the current at frequencies above the bandwidth for regulation of current at the desired operating frequency.

Figure 6:
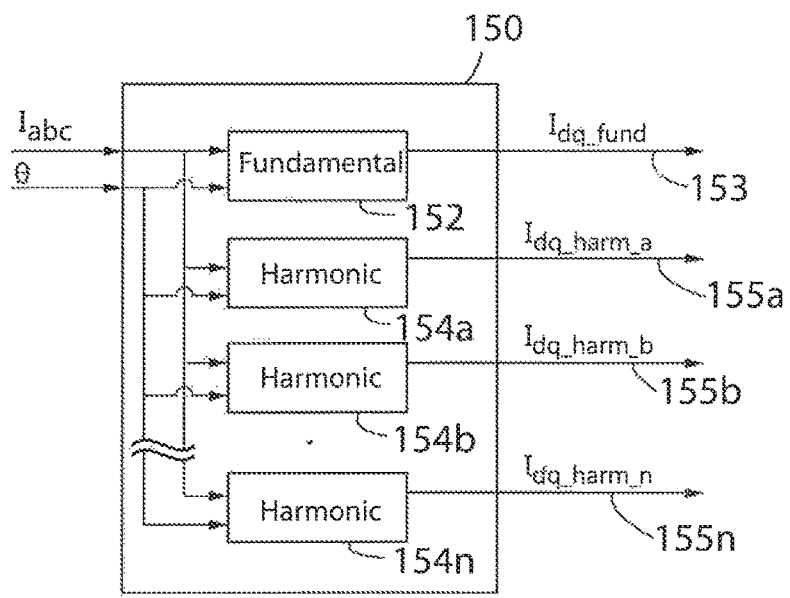
FIG. 6 is a block diagram representation of one embodiment of a frame transformer used in FIG. 5.

With reference to FIGS. 5 and 6, the current feedback signal ($I_{fdbk}$) is received at the feedback module 65 and provided to a reference frame transformer 150 within the controller 50. The current feedback signal ($I_{fdbk}$), as illustrated, includes multiple feedback signals, where each signal corresponds to an amplitude of current as measured. on one phase of the multi-phase motor 40. For a three-phase motor, it is contemplated that the amplitude of current is measured in all three phases of the motor. Optionally, the amplitude of current is measured in two phases of the motor and the amplitude of the third phase is determined as a function of the amplitude of the two measured phases.

The reference frame transformer 150 is configured to transform the current feedback signals from the stationary, physical reference frame in which the signals are measured to multiple rotating reference frames. The reference frame transformer 150 receives the stationary feedback signals ($I_{fdbk}$) and a position feedback signal ($\theta_{fdbk}$) as inputs. The position feedback signal ($\theta_{fdbk}$) corresponds to an angular position of the motor 40. The position feedback signal ($\theta_{fdbk}$) may be a mechanical angular position of the motor or an electrical angular position corresponding to the electrical angle of the current provided to the motor 40. The transform between reference frame, however, utilizes electrical angular position of the current to convert the current feedback signal from the stationary reference frame to a rotating reference frame. Therefore, if the position feedback signal ($\theta_{fdbk}$) is the mechanical angular position of the motor, the reference frame transformer 150 first converts the mechanical angular position of the motor to the electrical angle of the current as a function of the number of poles in the motor. In the stationary reference frame, the current applied to the motor 40 varies sinusoidally at a commanded frequency output by the motor controller 10. if the current feedback signals are converted to a reference frame that rotates at an identical frequency to the commanded frequency, the rotating reference frame is synchronous to the output current and the current feedback signal becomes a "DC", or constant, value.

In an ideal system, the current output to the motor is purely sinusoidal. The current feedback signal in the stationary frame is similarly sinusoidal and the current feedback signal in the synchronous frame is a DC value. However, effects of loading on the motor 40, speed of operation of the motor, switching in the inverter section 30, and the like introduce harmonic content on the current output to the motor. The harmonic content creates distortion on the sinusoidal waveform for the current feedback signal in the stationary frame and creates a ripple on the DC value of the current feedback signal in the synchronous frame.

A first transformation 152 is used to convert the measured current feedback signals to a synchronous reference frame rotating at the fundamental frequency of the current output to the motor 40. As shown below in Eqs. 2 and 3, the first transformation 152 utilizes the electrical angle of the motor and the amplitude of the currents measured in the motor to generate a synchronous current feedback signal 153 rotating at the fundamental frequency of the motor. Equation 2 defines the current in the "d" axis, and equation 3 defines the current in the "q" axis, Both currents are present when the feedback current is referred to in the d-q axes. The synchronous current feedback signal 153 output from the first transformation 152 is illustrated as being in the d-q axes and includes both components. The synchronous current feedback signal 153 is provided as an input to the current regulator 120 in order to control current supplied to the motor at the fundamental frequency.

$$i_{d\_fund} = \frac{2}{3}[i_a\cos\theta + i_b\cos(\theta - 120°) + i_c\cos(\theta - 240°)] \quad (2)$$

$$i_{q\_fund} = -\frac{2}{3}[i_a\sin\theta + i_b\sin(\theta - 120°) + i_c\sin(\theta - 240°)] \quad (3)$$

where:
$\theta$=electrical angle;
$i_a$=amplitude of current in phase "a" of the motor;
$i_b$=amplitude of current in phase "b" of the motor; and
$i_b$=amplitude of current in phase "c" of the motor.

A second transformation 154a is used to convert the measured current feedback signals to a synchronous reference frame rotating at a second frequency other than the fundamental frequency of the current output to the motor 40. As shown below in Eqs. 4-5, the second transformation 154a again utilizes the electrical angle of the motor and the amplitude of the currents measured in the motor. However, prior to performing the transformation, the electrical angle is multiplied by a negative factor. The negative sign causes the synchronous reference frame to rotate in a direction opposite to the direction of rotation of the reference frame at the fundamental frequency utilized by the first transformation 152. The factor increases the frequency of rotation of the reference frame to a desired multiple of the fundamental frequency. Consequently, the second transformation 154a generates a second synchronous current feedback signal 155a rotating in an opposite direction and at the second frequency rather than the fundamental frequency of the motor.

$$i_{d\_harm} = \frac{2}{3}[i_a\cos\theta_{harm} + i_b\cos(\theta_{harm} - 120°) + i_c\cos(\theta_{harm} - 240°)] \quad (4)$$

$$i_{q\_harm} = -\frac{2}{3}[i_a\sin\theta_{harm} + i_b\sin(\theta_{harm} - 120°) + i_c\sin(\theta_{harm} - 240°)] \quad (5)$$

where:
$\theta_{harm}$=−(harm−1)·$\theta$;
harm=harmonic number in synchronous frame;
$i_a$=amplitude of current in phase-a of the motor;
$i_b$=amplitude of current in phase-a of the motor; and
$i_b$=amplitude of current in phase-a of the motor.

As shown in Eqs. 4-5, the second transformation contemplates converting the current feedback signal to a synchronous reference frame by a factor that corresponds to harmonic content present in the current feedback signal. In the current feedback signal ($I_{fdbk}$), harmonic content is often present in pairs, where the pairs are separated by two harmonics. For example, the harmonic content may be present in the fifth and seventh harmonics of the fundamental frequency or in the eleventh and thirteenth harmonics of the fundamental frequency. The desired factor selected for the transformation in Eqs. 4-5 is the integer number between the pairs of harmonics present in the current feedback signal ($I_{fdbk}$) in the stationary reference frame. When the harmonic content in the stationary reference frame is transformed to the synchronous reference frame, the harmonic content present at each of the pairs of harmonics in the stationary reference frame becomes a DC value at the synchronous harmonic that falls between the pair of harmonics in the stationary reference frame. In other words, harmonic content at the fifth and seventh harmonics of the fundamental frequency in the stationary reference frame are transformed into a reference frame rotating at six times the fundamental frequency in the synchronous reference frame. Similarly, harmonic content at the eleventh and thirteenth or at the seventeenth and nineteenth harmonics in the stationary reference frame are transformed into a reference frame rotating at twelve or eighteen times the fundamental frequency, respectively, in the synchronous reference frame.

As illustrated in FIG. 6, it is further contemplated that the reference frame transformer 150 may output synchronous current feedback signals (155b-155n) in reference frames rotating at still other frequencies. Additional transformations (154b-154n) utilize Eqs. 4-5 to transform the stationary current feedback signals to the other synchronous current feedback signals by selecting an appropriate synchronous harmonic according to the presence of harmonic content in the stationary reference frame of the current feedback signal ($I_{fdbk}$). The second and each of the additional synchronous current feedback signals (155a-155n) are output from the corresponding transformation 154 and provided as an input to the current regulator 120 in order to control current supplied to the motor at the respective frequencies.

In one embodiment of the invention, the second and/or each additional frequency is defined in advance and stored in the memory device 45 of the motor controller 10. The second frequency may be identified, for example, as part of a commissioning process. An undesirable frequency may be detected in the motor 40 and the second frequency set at the undesirable frequency in order to attenuate the magnitude of the undesirable current component. Optionally, the second frequency may be set by adjusting a configuration parameter in the motor controller defining, for example, a known motor 40 to be connected to the motor controller 10 or a desired switching frequency at which the motor controller 10 is to operate. The operation of the motor controller 10 according to the selection defined in the configuration parameter may generate harmonic content at an expected frequency. The second frequency may then be set to attenuate the expected harmonic content resulting from the configuration of the motor controller 10.

According to another embodiment of the invention, the motor controller 10 is configured to monitor the harmonic content present on the current feedback signal ($I_{fdbk}$) and dynamically set the second and/or each additional frequency equal to a frequency as a function of the harmonic content detected. The magnitude of different harmonics present in the current feedback signal ($I_{fdbk}$) may be determined according to known methods. According to one method, the current feedback signal ($I_{fdbk}$) is provided as an input to a Discrete Fourier Transform (DFT) module. The DFT module is stored in the memory device 45 and executed by the controller 50. An exemplary DFT routine is presented below in Eq. 6. The DFT routine transforms a sampled time signal into a complex vector, containing magnitude and phase information, for a number of evenly spaced frequency bins between zero hertz and the sampling frequency of the current feedback signal ($I_{fdbk}$).

$$X(k) = \sum_{n=1}^{N} x(n) e^{-j2\pi(k-1)(n-1)/N} \text{ for } k = 1, \ldots, N/2 \quad (6)$$

where:
X(k)=frequency response at evenly spaced frequency
N=number of samples; and
x(n)=nth sample value.

The amplitude of the frequency content is monitored and a frequency of a harmonic component with the greatest amplitude may be selected as the second frequency. Optionally, a pair of harmonic components, such as the fifth and seventh or the eleventh and thirteenth having the greatest sum of amplitudes may be selected. In still other embodiments, multiple frequencies may be selected, where one of the frequencies is defined as the second frequency and other frequencies are defined as additional frequencies for the reference frame transformer 150. As a result, the motor controller 10 may dynamically monitor the harmonic content present on the current waveform and select harmonic content for attenuation by the current regulator 120 accordingly.

Figure 8:
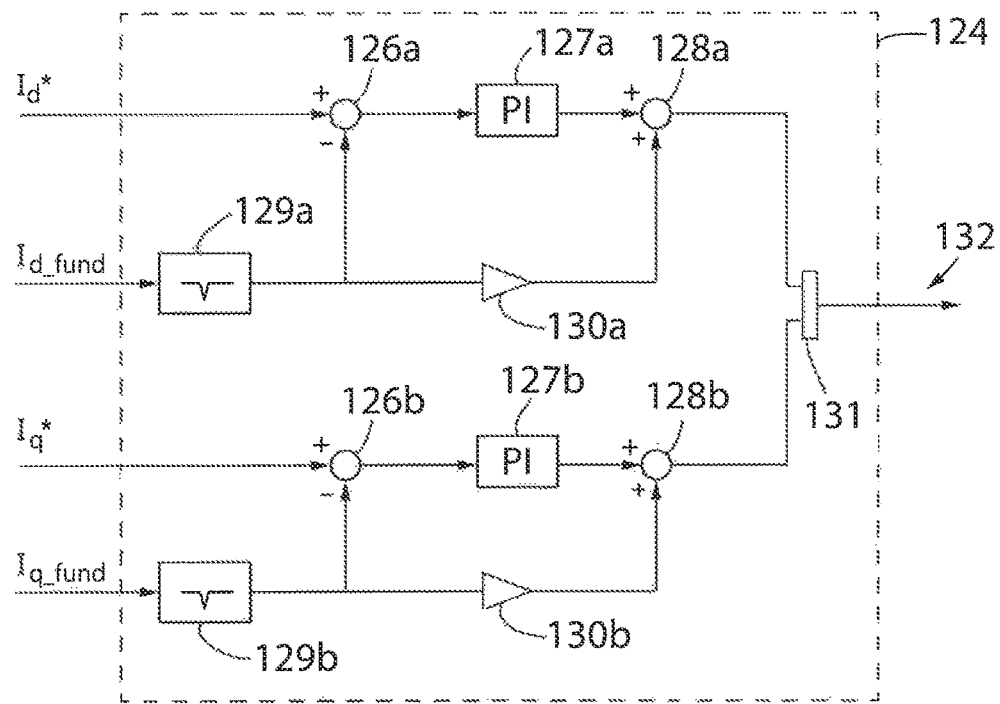
FIG. 8 is a block diagram representation of one embodiment of a synchronous frame current regulator executing at the fundamental frequency.
Figure 9:
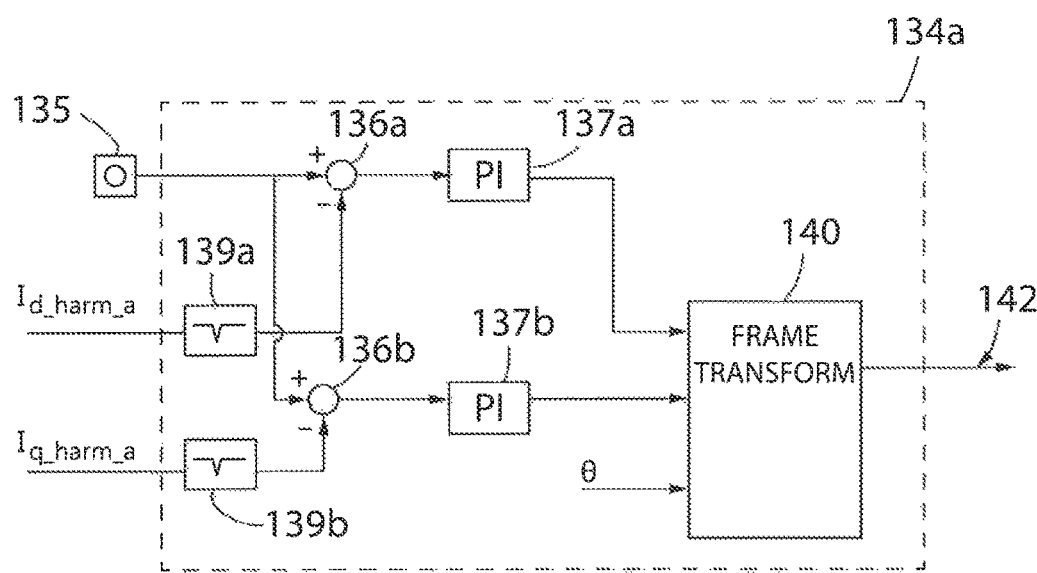
FIG. 9 is a block diagram representation of one embodiment of a synchronous frame current regulator executing at the harmonic frequency.

With reference next to FIGS. 7-9, the current regulator 120 receives the synchronous current feedback signals 153, 155 in each rotating reference frame and separate control paths within the current regulator 120 act on each reference frame. A first current regulator 124 is operatively configured to regulate current output to the motor 40 at the fundamental frequency. An exemplary bandwidth of the first current regulator ranges from 0-100 Hz to 0-1000 Hz. The first current regulator 124 is able to provide a desired current waveform to the motor that is less than the bandwidth of the regulator.

As illustrated in FIG. 8, the first current regulator 120 receives current reference signals for the d-axis, $I_d^*$, and for the q-axis, $I_q^*$ as inputs. Additionally, the first current regulator 120 receives the synchronous current feedback signals rotating at the fundamental frequency, $I_{d\_fund}$ and $I_{q\_fund}$. A first notch filter 129 is provided in the first current regulator 120 to attenuate components of the current feedback signal that are at the second frequency. The first notch filter 129 acts on both the "d" and "q" axes and is illustrated twice as a notch filter 129a in the d-axis synchronous current feedback path and as a notch filter 129b in the q-axis synchronous current feedback path. It is further contemplated that multiple first notch filters 129 may be provided within the first current regulator, where the frequency of each first notch filter 129 corresponds to either the second frequency or to an additional frequency at which there is an additional regulator 134b-134n executing. Each first notch filter 129 is configured to attenuate components of the current feedback signal present within the fundamental frequency reference frame that are to be regulated by another current regulator 134 acting in another reference frame to minimize interaction of the different regulators 124, 134 on the same frequency component. The filtered synchronous current feedback signal in each of the d and q axes is summed to the corresponding reference signal for the axis at a first regulator summing junction 126. The output of the first regulator summing junction 126 is provided to the control routine 127. The illustrated control routine 127 is a proportional-integral (PI) controller. Optionally, the control routine 127 may be just a proportional (P) controller or further include a derivative (D) component. Each of the proportional (P), integral (I), and/or derivative (D) components of the control routine 127 includes a controller gain. The output of the control routine 127 is provided as an input to a second regulator summing junction 128. The filtered synchronous current feedback signal in each of the d and q axes is also provided as an input to a gain block 130. The gain block 130 includes cross-coupling compensation terms. The output of each gain block 130 is provided as an additional input to the second regulator summing junction 128 and added to the output of the control routine 127. As illustrated, the "d" axis and the "q" axis each includes separate first summing junctions 126a, 126b; control routines 127a, 128b; second summing junctions 128a, 128b, first notch filters 129a, 129b; and gain blocks 130a, 130b, respectively. A final block 131 is illustrated to represent combing the output of the d and q axis regulators to provide a single regulator output signal 132, $I_{dq\_out\_fund}$, which contains the components of both the d and q axes.

As illustrated in FIG. 9, the second current regulator 134a receives the synchronous current feedback signals rotating at the second frequency, $I_{d\_harm\_a}$ and $I_{q\_harm\_b}$. Because it is desirable to reduce or eliminate these components, a fixed reference 135 set equal to zero is provided as an input for each axis. A second notch filter 139 is provided in the second current regulator 134a to attenuate components of the current feedback signal that are at the fundamental frequency. The second notch filter 139 acts on both the "d" and "q" axes and is illustrated twice as a notch filter 139a in the d-axis synchronous current feedback path and as a notch filter 139b in the q-axis synchronous current feedback path. It is further contemplated that multiple second notch filters 139 may be provided within the second current regulator, where the frequency of each second notch filter 139 corresponds to either to the fundamental frequency or to another frequency at which there is an additional regulator 154b-154n executing. Each second notch filter 139 is configured to attenuate components of the current feedback signal present within the second frequency reference frame that are to be regulated by another current regulator 152 or 154b-154n acting in another reference frame to minimize interaction of the different regulators 124, 134 on the same frequency component. The filtered synchronous current feedback signal in each of the d and q axes is summed to the corresponding reference signal for the axis at a regulator summing junction 136. The output of the regulator summing junction 136 is provided to the control routine 137. The illustrated control routine 137 is a proportional-integral (PI) controller. Optionally, the control routine 137 may be just a proportional (P) controller or further include a derivative (D) component. Each of the proportional (P), integral (I), and/or derivative (D) components of the control routine 137 includes a controller gain. The output of the control routine 137 is provided as an input to a frame transformation block 140. As illustrated, the "d" axis and the "q" axis each includes separate regulator summing junctions 136a, 136b; control routines 137a, 137b; and second notch filters 139a, 139b, respectively.

The frame transformation block 140 receives the output of each control routine 137a, 137b, for the d and q axes, respectively, as well as the electrical angle, θ, of the motor as inputs. The frame transformation block 140 within each regulator at the second frequency and/or at each additional frequency performs an inverse transformation to provide the output of the additional regulators 134 in a common reference frame with the first regulator 124. It is contemplated that the common reference frame may be the synchronous reference frame rotating at the fundamental frequency, the stationary reference frame, or any other suitable reference frame. If the common reference frame selected is the synchronous reference frame rotating at the fundamental frequency, the inverse transform may execute Eqs. 7-8, presented below.

$$i_{d\_harm\_fund} = [i_{d\_harm} \cos(\theta_{inverse\_1}) - i_{q\_harm} \sin(\theta_{inverse\_1})] \quad (7)$$

$$i_{q\_harm\_fund} = [i_{d\_harm} \sin(\theta_{inverse\_1}) + i_{q\_harm} \cos(\theta_{inverse\_1})] \quad (8)$$

where:

$$\theta_{inverse\_1} = -(harm) \cdot \theta;$$

harm=harmonic number in synchronous frame;
$i_{d\_harm}$=d-axis current in synchronous frame rotating at harmonic frequency; and
$i_{q\_harm}$=q-axis current in synchronous frame rotating at harmonic frequency.

Because the first regulator 124 is operating in the synchronous reference frame rotating at the fundamental frequency, the output of the first regulator 124 may be summed directly at a regulator summing junction 145 with the output of each additional regulator 134 when the inverse transform presented above in Eqs. 7-8 is utilized.

If the common reference frame selected is the stationary reference frame, the inverse transform may execute Eqs. 9-10, presented below.

$$i_{d\_harm\_stat} = [i_{d\_harm} \cos(\theta_{inverse\_2}) - i_{q\_harm} \sin(\theta_{inverse\_2})] \quad (9)$$

$$i_{q\_harm\_stat} = [i_{d\_harm} \sin(\theta_{inverse\_2}) + i_{q\_harm} \cos(\theta_{inverse\_2})] \quad (10)$$

where:

$$\theta_{inverse\_2} = -(harm-1) \cdot \theta;$$

harm=harmonic number in synchronous frame;
$i_{d\_harm}$=d-axis current in synchronous frame rotating at harmonic frequency; and
$i_{q\_harm}$=q-axis current in synchronous frame rotating at harmonic frequency.

Because the first regulator 124 is operating in the synchronous reference frame rotating at the fundamental frequency, the output of the first regulator 124 would similarly need to be transformed into the stationary reference frame prior to summing the output of each additional regulator 134 when the inverse transform presented above in Eqs. 9-10 is utilized such that each component of the current regulator 120 is in a common reference frame. After combining the outputs of the regulators 124, 134 in a common reference frame, the current regulator 120 outputs a single voltage reference to the gate driver module 60 in order to produce the desired current in the motor 40 to achieve desired operation.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for reducing current harmonic distortion in a motor controller, wherein the motor controller is operative to control operation of a multi-phase motor, the system comprising:
   at least two inputs, each input configured to receive a feedback signal corresponding to a current present in one phase of the motor;
   a reference frame transformer operative to convert the feedback signals from the at least two inputs to a first synchronous current feedback signal and a second synchronous current feedback signal, wherein the first synchronous current feedback signal is at a fundamental frequency and the second synchronous current feedback signal is at a harmonic frequency;
   a first current regulator configured to receive a current reference signal and the first synchronous current feedback signal as inputs and to generate a first regulator output signal corresponding to desired operation of the motor at the fundamental frequency; and
   a second current regulator configured to receive the second synchronous current feedback signal as an input and to generate a second regulator output signal at the harmonic frequency, wherein the motor controller is operative to sum the first regulator output signal and the second regulator output signal to generate a modified current regulator output signal.

2. The system of claim 1 further comprising a first notch filter configured to receive the first synchronous current feedback signal as an input and to output a first filtered synchronous current signal, wherein the first notch filter has a first filter frequency set at the harmonic frequency.

3. The system of claim 2 further comprising a second notch filter configured to receive the second synchronous current feedback signal as an input and to output a second filtered synchronous current signal, wherein the second notch filter has a second filter frequency set at the fundamental frequency.

4. The system of claim 1 wherein the reference frame transformer is further operative to convert the feedback signals to at least one additional synchronous current feedback signal, wherein each additional current feedback signal is at an additional harmonic frequency different than the harmonic frequency.

5. The system of claim 4 further comprising at least one additional current regulator wherein:
   each additional current regulator corresponds to one of the at least one additional synchronous current feedback signals,
   each additional current regulator generates an additional regulator output signal at the corresponding additional harmonic frequency, and
   the motor controller is further operative to sum each additional regulator output signal to the first regulator output signal and the second regulator output signal to generate the modified current regulator output signal.

6. A method for reducing current harmonic distortion in a motor controller, wherein the motor controller is operative to control operation of a multi-phase motor, the method comprising the steps of:
   receiving a feedback signal from at least two current sensors, each feedback signal corresponding to a current present in one phase of the motor;
   transforming the feedback signal to a first synchronous current feedback signal at a first frequency;
   transforming the feedback signal to a second synchronous current feedback signal at a second frequency, wherein the second frequency is greater than the first frequency;
   executing a first current regulator operatively tuned for the first frequency to generate a first regulator output signal as a function of the first synchronous current feedback signal;
   executing a second current regulator operatively tuned for the second frequency to generate a second regulator output signal as a function of the second synchronous current feedback signal; and
   generating an output signal for the motor controller that is a function of the first regulator output signal and the second regulator output signal.

7. The method of claim 6 further comprising the step of transforming the second regulator output signal to the first frequency, wherein the step of generating the output signal for the motor controller includes summing the first regulator output signal with the second regulator output signal transformed to the first frequency.

8. The method of claim 7 further comprising the step of filtering the first synchronous current feedback signal via a first notch filter prior to executing the first current regulator, wherein the first notch filter has a first filter frequency set at the second frequency.

9. The method of claim 8 further comprising the step of filtering the second synchronous current feedback signal via a second notch filter prior to executing the second current regulator, wherein the second notch filter has a second filter frequency set at the first frequency.

10. The method of claim 7 further comprising the steps of:
    transforming the feedback signal to at least one additional synchronous current feedback signal at an additional frequency, wherein each additional frequency is different than the first and second frequencies; and
    executing at least one additional current regulator, wherein each additional current regulator corresponds to one of the additional synchronous current feedback signals and is operatively tuned for the corresponding additional frequency and generates an additional regulator output signal as a function of the additional synchronous current feedback signal.

11. The method of claim 10 further comprising the step of transforming each additional regulator output signal to the first frequency, wherein the step of generating the output signal for the motor controller includes summing the first regulator output signal with the second regulator output signal transformed to the first frequency and with each additional regulator output signal transformed to the first frequency.

12. The method of claim 6 further comprising the steps of:
    performing a frequency analysis of the feedback signals received from the at least two current sensors to identify an amplitude of a plurality of frequency components of the current present in the motor;
    identifying one of the frequency components of the current to attenuate; and
    setting the second frequency for the second synchronous current feedback signal equal to a frequency of the identified frequency component.

13. A motor controller for reducing current harmonic distortion output to a multi-phase motor, the motor controller comprising:
    at least two current sensors, each current sensor configured to generate a feedback signal corresponding to a current output to one phase of the motor;
    a memory device configured to store a series of instructions; and
    a processor operative to execute the series of instructions to:
      receive the feedback signals from the at least two current sensors,
      transform the feedback signals to a first synchronous current feedback signal at a first frequency,
      transform the feedback signals to a second synchronous current feedback signal at a second frequency,
      execute a current regulator to independently regulate current at the first frequency and at the second frequency, and
      generate an output signal from the current regulator that is a function of the independently regulated first and second frequencies.

14. The motor controller of claim 13 wherein:
    the current regulator includes at least two current regulators,
    a first current regulator is configured to receive a current reference signal and the first synchronous current feedback signal as inputs and to generate a first regulator output signal corresponding to desired operation of the motor at the first frequency, and a second current regulator is configured to receive the second synchronous current feedback signal as an input and to generate a second regulator output signal at the second frequency, and the processor is operative to generate the output signal from the current regulator by summing the first regulator output signal and the second regulator output signal.

15. The motor controller of claim 14 wherein the first current regulator includes a first notch filter configured to receive the first synchronous current feedback signal as an input and to output a first filtered synchronous current signal, wherein the first notch filter has a first filter frequency set at the second frequency.

16. The motor controller of claim 15 further wherein the second current regulator includes a second notch filter configured to receive the second synchronous current feedback signal as an input and to output a second filtered synchronous current signal, wherein the second notch filter has a second filter frequency set at the first frequency.

17. The motor controller of claim 14 wherein the processor is further operative to transform the feedback signals to at least one additional synchronous current feedback signal, wherein each additional current feedback signal is an additional harmonic frequency different than the first or second frequencies.

18. The motor controller of claim 17 further comprising at least one additional current regulator wherein:

each additional current regulator corresponds to one of the at least one additional synchronous current feedback signals, each additional current regulator generates an additional regulator output signal at the corresponding additional harmonic frequency, and the processor is further operative to sum each additional regulator output signal to the first regulator output signal and the second regulator output signal to generate the output signal from the current regulator.

19. The motor controller of claim 13 wherein the processor is further operative to identify an amplitude of a plurality of frequency components of the current present in the motor by performing a frequency analysis of the feedback signals received from the at least two current sensors.

20. The motor controller of claim 19 wherein the processor is further operative to identify one of the frequency components of the current to attenuate and the second frequency for the second synchronous current feedback signal is set equal to a frequency of the identified frequency component.

* * * * *